UNITED STATES PATENT OFFICE.

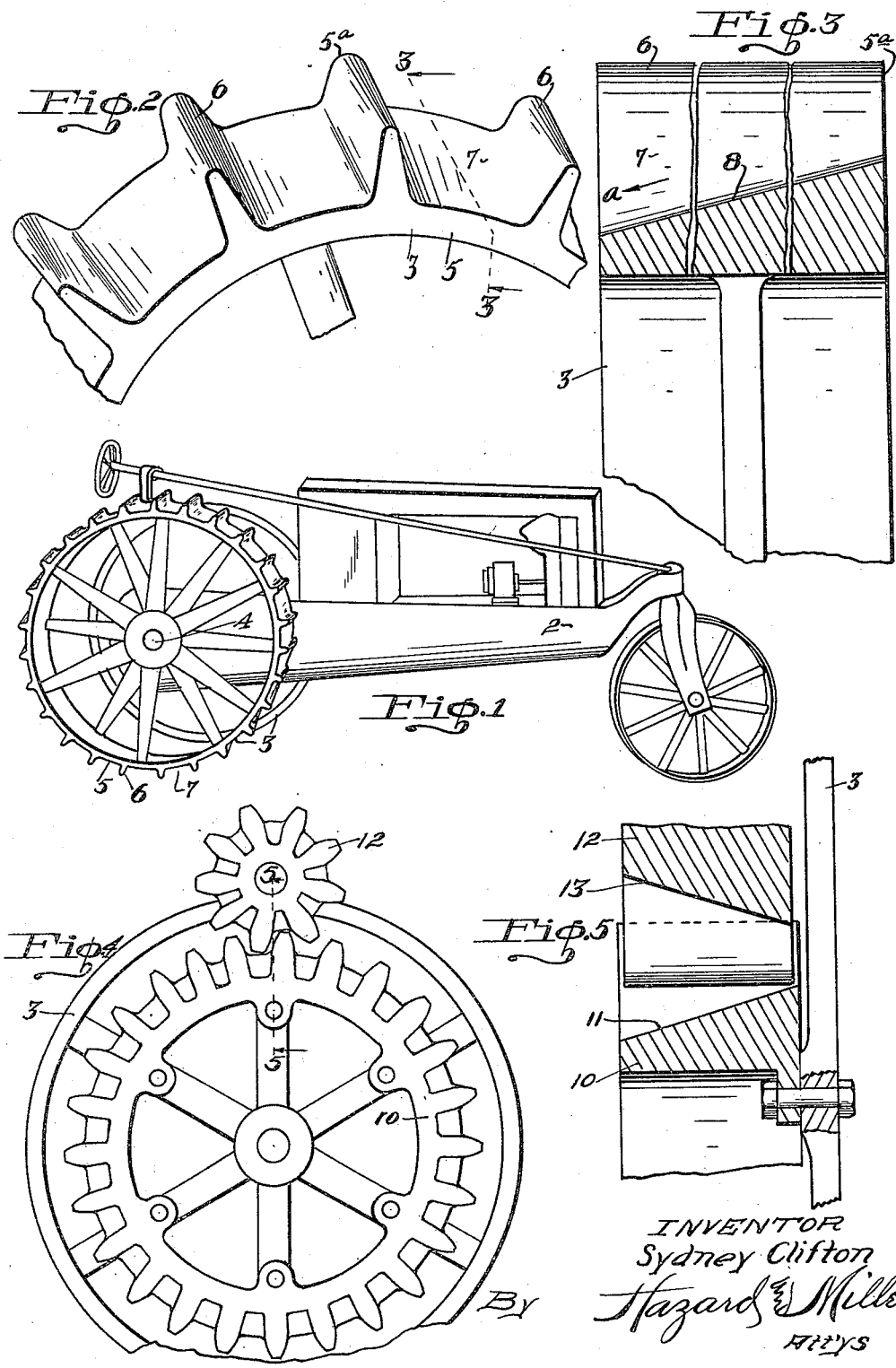

SYDNEY CLIFTON, OF LOS ANGELES, CALIFORNIA, ASSIGNOR TO LEONARD M. ALLEN, OF BURBANK, CALIFORNIA.

SELF-CLEANING TRACTOR WHEEL AND GEAR.

1,392,866.

Specification of Letters Patent.

Patented Oct. 4, 1921.

Application filed December 11, 1919. Serial No. 344,165.

*To all whom it may concern:*

Be it known that I, SYDNEY CLIFTON, a citizen of the United States, residing at Los Angeles, in the county of Los Angeles and State of California, have invented new and useful Improvements in Self-Cleaning Tractor Wheels and Gears, of which the following is a specification.

This invention relates to vehicles and more particularly to traction wheels and driving means therefor, and has for its object to provide means for automatically maintaining the valleys between the grouser teeth of the traction wheels and also the gear teeth of the traction driving wheels clean or free from packed earth.

It is well known that in various types of traction wheels the peripheral faces of the same are constructed and arranged to increase the traction, and working over certain kinds of soil the earth becomes firmly compressed in the valleys between the grouser teeth so that the wheel is made substantially circular in its tread portion and the desired tractive efficiency is lost.

The present invention therefore consists of the construction and details to eliminate the packing of the soil, embodiments of the invention being illustrated in the accompanying drawings and described and claimed herein.

Figure 1 is a side elevation of a form of tractor showing the axle driving traction wheels incorporating the invention.

Fig. 2 is a perspective on a larger scale of a fragment of the traction wheel of Fig. 1.

Fig. 3 is a transverse section on line 3—3 of Fig. 2.

Fig. 4 is a side elevation showing a portion of an improved traction wheel of the gear driven type, both the gear and the wheel being provided with the invention.

Fig. 5 is a section on line 5—5 of Fig. 4.

My present improvements may be embodied in various types of traction wheels and consist in the peculiar formation of the traction surface of the wheel and of the exposed surface of traction wheel driving gears when the latter are so located as to become clogged with the soil over which the traction wheel may be driven.

In Fig. 1 is illustrated a traction engine 2 having rear traction wheels 3—3, which in the present case are driven by their axle 4, The rim 5 of the traction wheel is provided with transverse projecting portions commonly termed grousers indicated at 6, the function of which is to bite into the soil to prevent slipping of the wheel or wheels under the load of the vehicle and torque of the driving shaft.

Certain characters of soil over which heavy vehicles of various types are driven tend to quickly pack, solidify and fill up in the spaces or valleys 7 between the grouser teeth, and to overcome this packing without the use of extraneous cleaning devices I give the peripheral face of the traction wheel a generally conical formation as clearly indicated at 8 in Fig. 3, or in other words form the wheel rim as the frustum of a cone. The wheel as thus formed can be set either with its base inwardly or outwardly and the dirt will be automatically expressed laterally as in the direction of the arrow $a$, Fig. 3, during the rotation of the wheel under the pressure of the load so that it cannot become packed and solidified and thus fill up the valleys to the circle formed by the longitudinal outer edges of the teeth 6.

To further facilitate this self-cleaning action of the wheel face the grouser teeth 6 are also preferably tapered from the base or larger diameter face end $5^a$ of the wheel toward the smaller end face of the wheel as is clearly seen in Fig. 2. In other words the valley between a pair of contiguous teeth 6—6 converges from the smaller diametrical side of the traction wheel toward the upwardly inclined and opposite end of the wheel so that there are no parallel faces on the traction wheel peripheral surface between which the soil can become packed.

In some types of vehicles the traction wheel 3 instead of being driven by its axle is driven through means of a master gear 10, Figs. 4 and 5, attached to or formed on one side of the traction wheel and which master gear is generally of such diameter that its peripheral surface rolls into close position relative to the surface and therefore becomes clogged with the soil in the same manner that the traction wheel packs up, and my invention is shown incorporated in the master gear 10 in Figs. 4 and 5, in which the roots of the teeth or the valleys between the bases of the teeth are beveled from one end face of the gear to the other as indicated at 11 so that the dirt will be automatically dislodged from the valleys during the rotation of the wheel.

The driving pinion 12, Figs. 4 and 5, of the master gear 10 may also have the valleys between its teeth tapered from one end face to the other as at 13.

Various changes may be made without departing from the spirit of my invention as claimed.

I claim:

A wheel having the outer face of its rim beveled from one side to the other, teeth formed integral with said rim and projecting outwardly from said beveled outer face, the outer faces of which teeth lie substantially parallel with the axis of the wheel, the side faces of the bodies of the teeth being formed on convergent radial lines so that the bodies of said teeth are substantially wedge shape in cross section, and said side faces also being formed on convergent longitudinal lines so that the bodies of the teeth gradually decrease in thickness toward their higher ends.

In testimony whereof I have signed my name to this specification.

SYDNEY CLIFTON.